(12) United States Patent
Zeng et al.

(10) Patent No.: US 8,434,766 B2
(45) Date of Patent: May 7, 2013

(54) TURBINE ENGINE SEALS

(75) Inventors: Xiaoqiang Zeng, Albany, NY (US); Jonathon Edward Slepski, Clifton Park, NY (US); Tao Guo, Niskayuna, NY (US); Joshy John, Karnataka (IN); Sudhakar Neeli, Karnataka (IN)

(73) Assignee: General Electric Company, Schenectady, NY (US)

( * ) Notice: Subject to any disclaimer, the term of this patent is extended or adjusted under 35 U.S.C. 154(b) by 358 days.

(21) Appl. No.: 12/858,701

(22) Filed: Aug. 18, 2010

(65) Prior Publication Data

US 2012/0043728 A1 Feb. 23, 2012

(51) Int. Cl.
*F16J 15/447* (2006.01)

(52) U.S. Cl.
USPC .......................................... 277/419; 277/412

(58) Field of Classification Search .................. 277/409, 277/411, 412, 418, 420
See application file for complete search history.

(56) References Cited

U.S. PATENT DOCUMENTS

| | | | |
|---|---|---|---|
| 4,351,532 | A | 9/1982 | Laverty |
| 4,820,119 | A | 4/1989 | Joyce |
| 5,029,876 | A | 7/1991 | Orlando et al. |
| 5,244,216 | A | 9/1993 | Rhode |
| 5,890,873 | A | 4/1999 | Willey |
| 6,257,586 | B1 | 7/2001 | Skinner et al. |
| 6,261,057 | B1 | 7/2001 | Turnquist et al. |
| 6,860,483 | B2 | 3/2005 | McCutchan |
| 7,344,357 | B2 | 3/2008 | Couture, Jr. et al. |
| 8,182,211 | B2 * | 5/2012 | Steiger et al. .............. 415/173.7 |

* cited by examiner

*Primary Examiner* — Gilbert Lee
(74) *Attorney, Agent, or Firm* — James W. Pemrick; Ernest G. Cusick; Frank A. Landgraff

(57) ABSTRACT

A seal is provided for preventing axial leakage through a radial gap between a stationary structure and a rotating structure. The radial gap is defined by an inner radial surface opposing an outer radial surface across the radial gap. The seal includes at least one land disposed on one of the inner radial surface and outer radial surface. At least one first tooth and at least one second tooth project from the other of the radial surfaces. The second tooth is shorter than the first tooth. At least one of the first tooth and second tooth, is configured to extend at an angle upstream. This angle is defined between a radial surface from which the first or second tooth projects and an upstream surface of the same tooth. The angle is less than or equal to about 80 degrees.

20 Claims, 6 Drawing Sheets

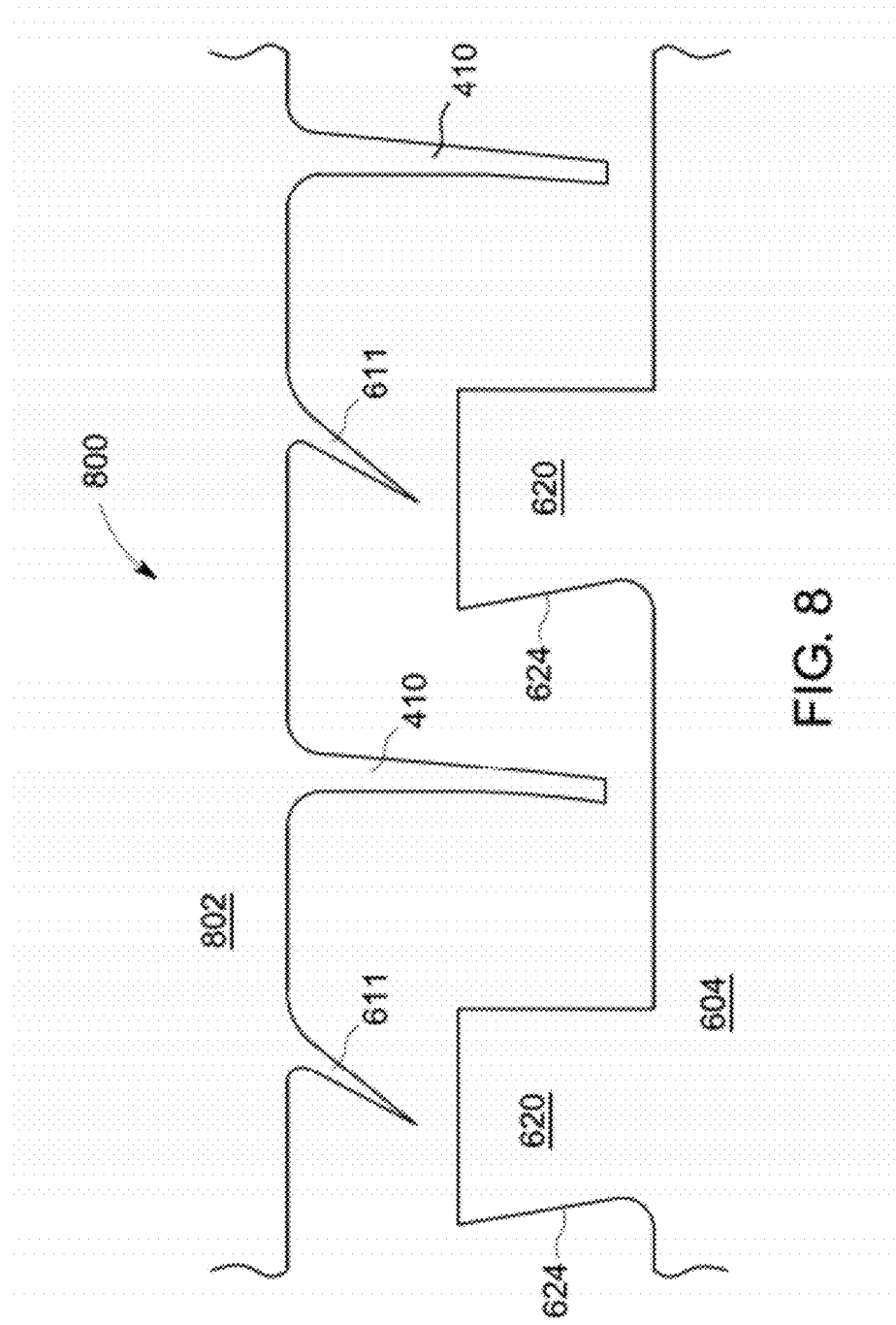

US 8,434,766 B2

TURBINE ENGINE SEALS

BACKGROUND OF THE INVENTION

The present invention relates generally to systems and apparatus for improving the efficiency and operation of turbine engines, which, as used here and unless specifically stated otherwise, is meant to include all types of turbine or rotary engines, including steam turbine engines, combustion turbine engines, aircraft engines, power generation engines, and others. More specifically, but not by way of limitation, the present invention relates to systems and apparatus pertaining to seals for turbine engines and, specifically, to minimizing leakage flow between stationary and rotating parts of a turbine engine.

In many turbine engines, labyrinth seals are often used as a means of minimizing the leakage of working fluid between stationary and rotating parts. These stationary and rotating parts are generally radial in shape. In general, these seals include, on either the stationary or rotating part, multiple axially spaced teeth that are either machined integrally with, or inserted into the radial surface. Typically, the opposing radial surface is machined to provide axially spaced, protruding annular lands that, along with the radial surfaces between the lands, are regarded as part of the sealing assembly. The gap between the teeth and the high and low parts of the lands is called a "clearance" and maintaining minimal clearance is essential in minimizing the leakage of working fluid, which improves the efficiency of the engine.

However, operational transient conditions, which, for example, may include engine startup, shutdown, or load swings, often result in axial movement and radial expansion of the rotating parts in relation to stationary parts, which may cause the teeth or other structures that define the labyrinth seal on one radial surface to contact or collide with the teeth or structures on the opposing radial surface. This contact typically results in the wear of the teeth and the profiles of the radial surfaces. Such damage may result in a compromised seal and an increase in working fluid leakage.

Conventional steam turbine design practice generally requires a tradeoff between, on the one hand, providing effective sealing and, on the other, ensuring minimal damage to the seal. Existing seals may provide effective sealing, but their design results in subsequent damage to the seal due to axial movement of the rotor. Alternatively, other conventional seals prevent such damage, but require large clearances that do a poor job of sealing the flow of working fluid through the gap.

BRIEF DESCRIPTION OF THE INVENTION

One aspect of the present invention provides a seal for preventing axial leakage through a radial gap between a stationary structure and a rotating structure. The radial gap is defined by an inner radial surface opposing an outer radial surface across the radial gap. The seal includes at least one land disposed on one of the inner radial surface and outer radial surface. At least one first tooth and at least one second tooth project from the other of the radial surfaces. The second tooth is shorter than the first tooth. At least one of the first tooth and second tooth, is configured to extend at an angle upstream. This angle is defined between a radial surface from which the first or second tooth projects and an upstream surface of the same tooth. The angle is less than or equal to about 80 degrees.

BRIEF DESCRIPTION OF THE DRAWINGS

These and other features of this invention will be more completely understood and appreciated by careful study of the following more detailed description of exemplary embodiments of the invention taken in conjunction with the accompanying drawings, in which:

FIG. 8 illustrates a partial cross-sectional view of a labyrinth seal that may be used with the steam turbine shown in FIG. 1, according to an aspect of the present invention.

DETAILED DESCRIPTION OF THE INVENTION

At least one aspect of the present invention is described below in reference to its application in connection with and operation of a steam turbine. However, it should be apparent to those skilled in the art and guided by the teachings herein that the present invention is likewise applicable to any suitable engine, gas turbine, steam turbine, turbine or turbine engine.

In addition, several descriptive terms may be used herein. The meaning for these terms shall include the following definitions. As used herein, "downstream" and "upstream" are terms that indicate a direction relative to the flow of working fluid through the turbine. As such, the term "downstream" means the direction of the flow, and the term "upstream" means in the opposite direction of the flow through the turbine. Related to these terms, the terms "aft" and/or "trailing edge" refer to the downstream direction, the downstream end and/or in the direction of the downstream end of the component being described. And, the terms "forward" or "leading edge" refer to the upstream direction, the upstream end and/or in the direction of the upstream end of the component being described. The term "radial" refers to movement or position perpendicular to an axis. It is often required to describe parts that are at differing radial positions with regard to an axis. In this case, if a first component resides closer to the axis than a second component, it may be stated herein that the first component is "inboard" or "radially inward" of the second component. If, on the other hand, the first component resides further from the axis than the second component, it may be stated herein that the first component is "outboard" or "radially outward" of the second component. The term "axial" refers to movement or position parallel to an axis. And, the term "circumferential" refers to movement or position around an axis. The term "nozzle" in a steam turbine refers to the same structure as "stator" in a gas turbine and a jet engine.

Figure 1:
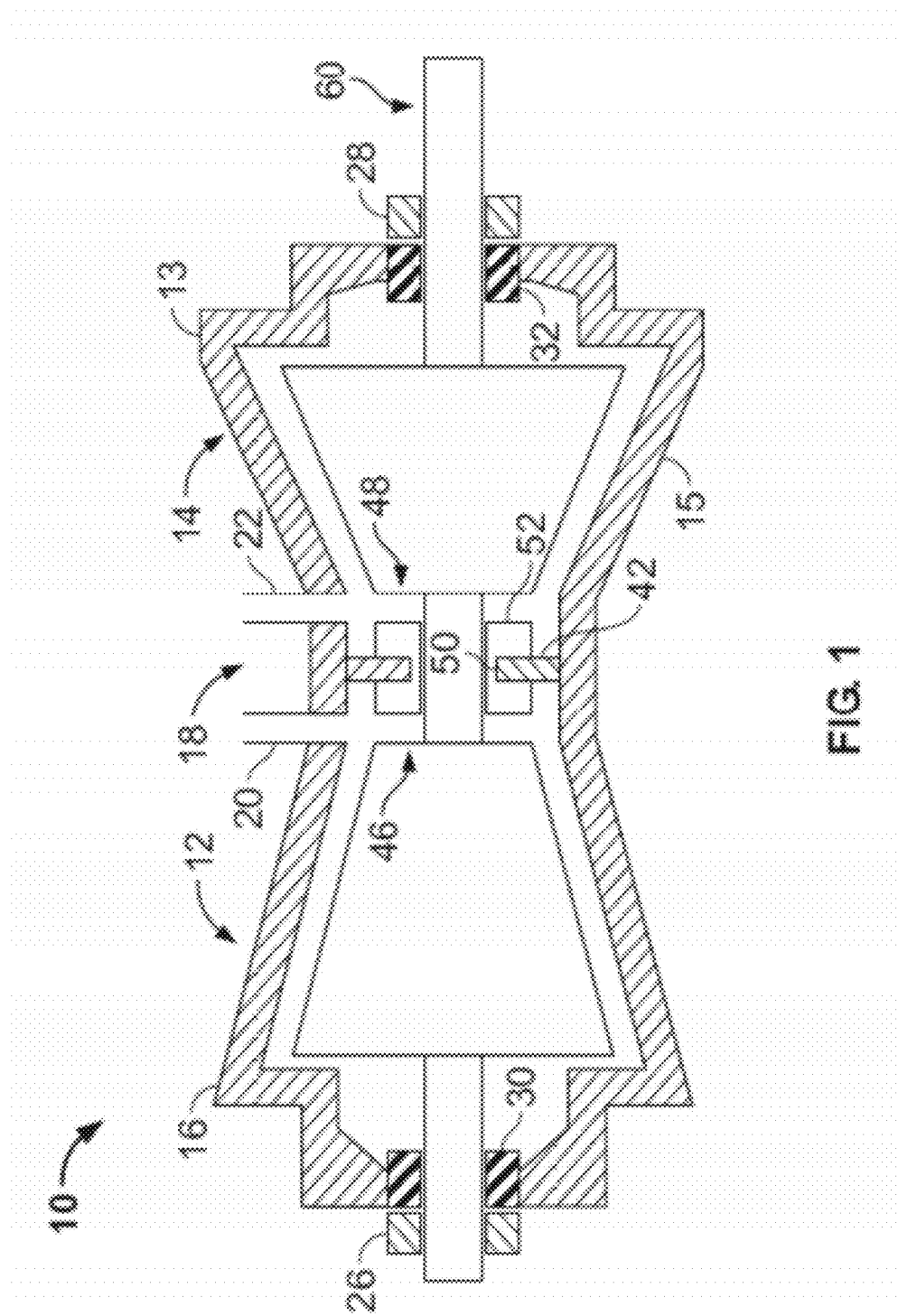
FIG. 1 is a schematic illustration of an exemplary opposed flow High Pressure (HP)/Intermediate Pressure (IP) steam turbine.

FIG. 1 is a schematic illustration of an exemplary opposed-flow steam turbine 10 including a high pressure (HP) section 12 and an intermediate pressure (IP) section 14. An outer shell or casing 16 is divided axially into upper and lower half sections 13 and 15, respectively, and spans both HP section 12 and IP section 14. A central section 18 of shell 16 includes a high pressure steam inlet 20 and an intermediate pressure steam inlet 22. Within casing 16, HP section 12 and IP section 14 are arranged in a single bearing span supported by journal bearings 26 and 28. A steam seal unit 30 and 32 is located inboard of each journal bearing 26 and 28, respectively.

An annular section divider 42 extends radially inwardly from central section 18 towards a rotor shaft 60 that extends between HP section 12 and IP section 14. More specifically, divider 42 extends circumferentially around a portion of rotor shaft 60 between a first HP section nozzle 46 and a first IP section nozzle 48. Divider 42 is received in a channel 50 defined in packing casing 52. More specifically, channel 50 may be a C-shaped channel that extends radially into a packing casing 52 and around an outer circumference of packing casing 52, such that a center opening of channel 50 faces radially outwardly.

During operation, high pressure steam inlet 20 receives high pressure/high temperature steam from a steam source, for example, a power boiler (not shown). Steam is routed through HP section 12 wherein work is extracted from the steam to rotate rotor shaft 60. The steam exits HP section 12 and is returned to the boiler wherein it is reheated. Reheated steam is then routed to intermediate pressure steam inlet 22 and returned to IP section 14 at a reduced pressure than steam entering HP section 12, but at a temperature that is approximately equal to the temperature of steam entering HP section 12. Accordingly, an operating pressure within HP section 12 is higher than an operating pressure within IP section 14, such that steam within HP section 12 tends to flow towards IP section 14 through leakage paths that may develop between HP section 12 and IP section 14. One such leakage path may be defined extending through packing casing 52 within rotor shaft 60.

Figure 2:
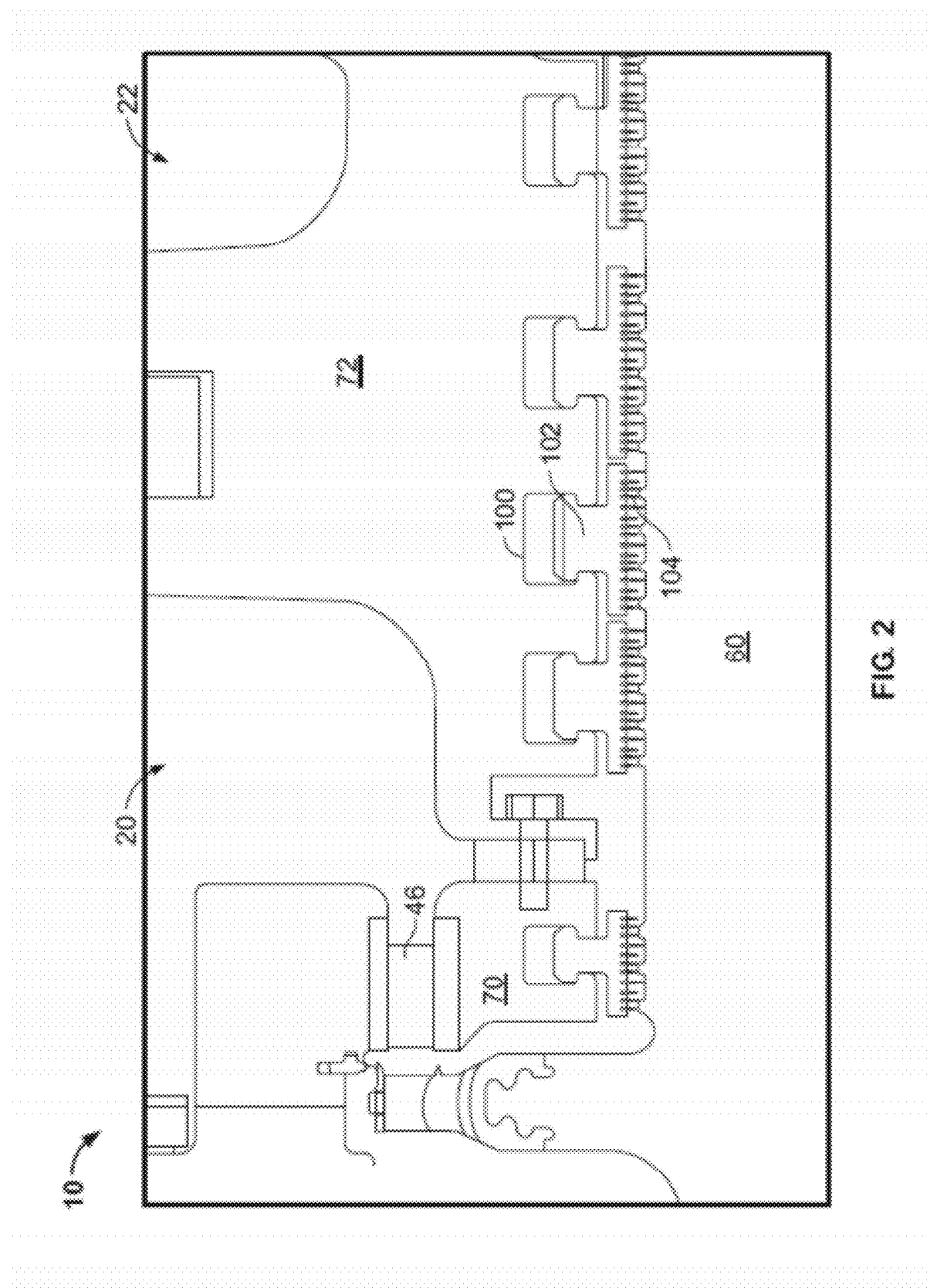
FIG. 2 is an enlarged schematic illustration of a turbine nozzle diaphragm and a packing or sealing casing that may be used with the steam turbine shown in FIG. 1.

FIG. 2 is an enlarged schematic illustration of an exemplary turbine nozzle diaphragm 70 and a packing or sealing casing 72 that may be used with turbine 10. In the exemplary embodiment, nozzle diaphragm 70 is a first stage diaphragm used with high pressure turbine 12. Moreover, in the exemplary embodiment packing casing 72 includes a plurality of labyrinth seal assemblies 100 that facilitate reducing leakage from HP section 12 to IP section 14 along rotor shaft 60. Labyrinth seal assemblies 100 include longitudinally spaced-apart rows of teeth 104 attached to a seal ring 102 that facilitate sealing against operating pressure differentials that may be present in a steam turbine such as turbine 10. In an alternative embodiment, packing casing 52 includes brush seals that may also be used to facilitate minimizing leakage through a gap defined between two components, such as leakage flowing from a higher pressure area to a lower pressure area.

In operation, steam at higher pressure in HP section 12 tends to leak through a steam path defined between first stage nozzle diaphragm 70 and packing casing 72 to IP section 14, an area at a lower operating pressure. For example, in one embodiment, high pressure steam is admitted to HP section 12 at approximately 1800 pounds per square inch absolute (psia), and reheat steam is admitted to IP section 14 at between approximately 300-400 psia. Accordingly, a relatively large pressure drop across packing casing 72 may cause steam to leak around packing casing 72 along rotor shaft 60 resulting in a reduction in steam turbine efficiency.

Figure 3:
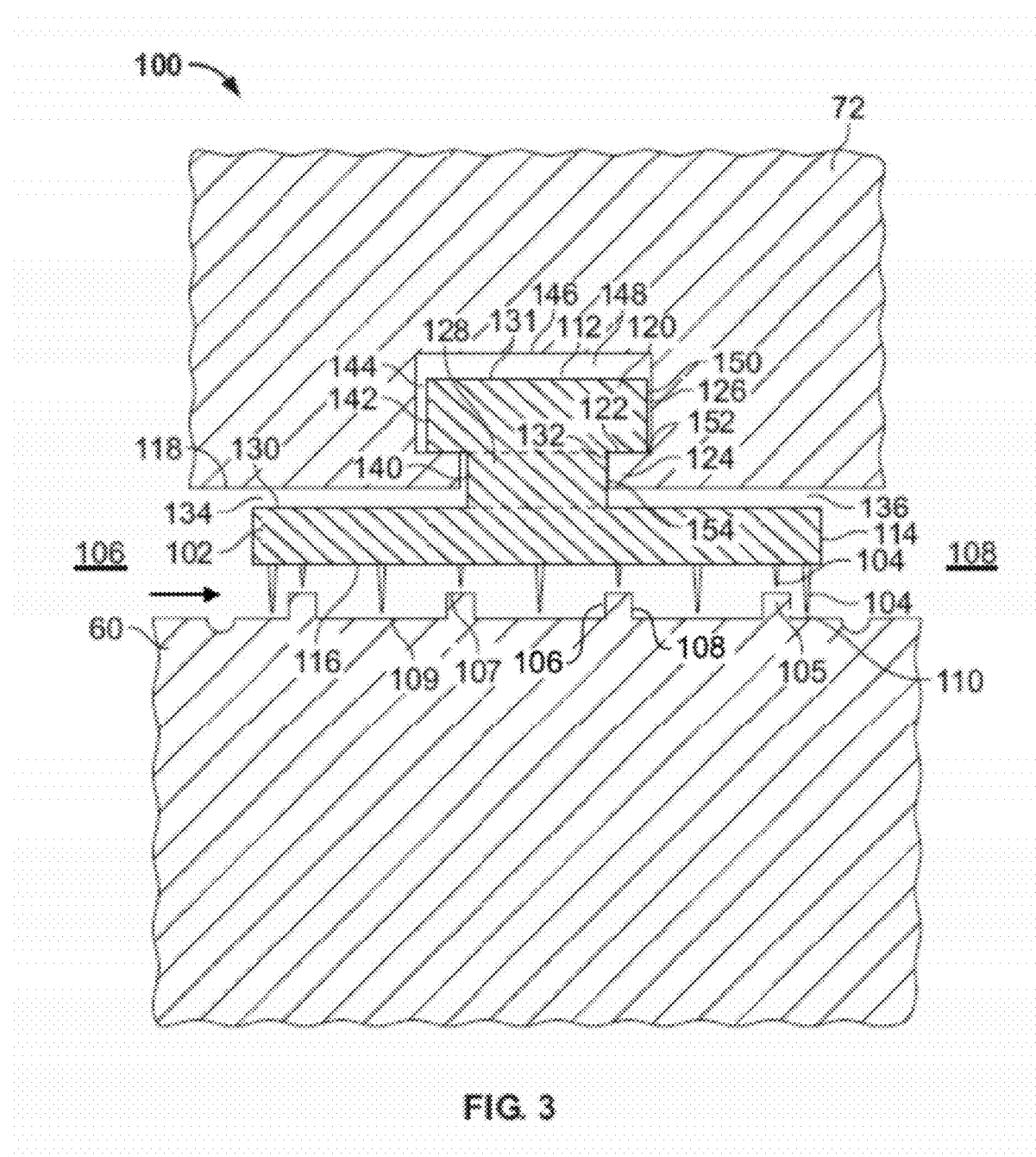
FIG. 3 is an exemplary embodiment of a labyrinth seal assembly that may be used with the steam turbine shown in FIG. 1.

FIG. 3 is an exemplary embodiment of a labyrinth seal assembly 100 that may be used with turbine 10. In FIG. 3 only a portion of rotor shaft 60 and a portion of casing 72 are illustrated. Furthermore, although only a single seal ring 102 is illustrated, several such rings could be arranged in series as shown in FIG. 2. In alternative embodiments, labyrinth seal assemblies 100 are used to facilitate sealing in other areas of turbine 10.

Seal ring 102 includes a plurality of teeth 104 positioned in opposition to a plurality of rotor shaft circumferential projections or lands 105 extending outward from rotor shaft 60. In the exemplary embodiment, each circumferential projection or land 105 includes radially outer rotor surfaces 107 positioned between a plurality of radially inner rotor surfaces 109. Assuming fluid flow is from the left to the right, each land 105 also includes an upstream axial surface 106 and a downstream axial surface 108. The teeth 104, and land axial surfaces 106, 108 are all aligned in the radial direction. In some known labyrinth seals the height of the land (i.e., height of axial surfaces 106, 108) is two fifths of the seal height (i.e., distance between radial surface 116 and radially inner rotor surface 109).

As explained above, a positive force may force fluid flow between the multiple restrictions formed by a clearance area 110 defined between teeth 104 and rotor shaft 60. The clearance area may also be defined as the distance between the end (or bottom) of teeth 104 and the top of lands 105. More specifically, the combination of clearance area 110, the number, and relative sharpness, of teeth 104, the number of rotor lands 105, and the operating conditions, including pressure and density, are factors that determine the amount of leakage flow. This design of seal must maintain a small clearance distance (e.g., 40 mils, where 1 mil=0.0254 millimeters) to obtain the desired performance characteristics, and as discussed before may cause problems during start up or shut down procedures.

Each seal ring 102 is retained in a casing groove 112 defined in casing 72. In one embodiment, each seal ring 102 includes a plurality of seal ring segments (not shown in FIG. 3) that may be positioned within casing groove 112 to facilitate ease of assembly or disassembly of casing 72. In the other embodiments, a system of springs (not shown in FIG. 3) induces a force that will tend to enlarge a diameter of seal ring 102 and a second system of springs (not shown in FIG. 3) may be used to counter the force induced by the weight of seal ring 102.

Each seal ring 102 includes an inner ring portion 114 having teeth 104 extending from a radially inner surface 116, and a radially outer surface 130 that facilitates controlling clearance area 110 by contacting a radial surface 118 of casing 72. Each seal ring 102 also includes an outer ring portion 120 that is positioned within casing groove 112. Outer ring portion 120 includes an inner circumferential surface 122 and an opposite radially outer surface 131. Inner circumferential surface 122 contacts an outer surface 126 of a casing groove shoulder 124 such that radial inward movement of seal ring 102 is limited. Seal ring 102 also includes a neck portion 128 extending between seal ring inner ring portion 114 and seal ring outer ring portion 120. Casing groove shoulder 124 interacts with seal ring neck portion 128 to axially locate each seal ring 102. Seal ring neck portion 128 includes a contact pressure surface 132 that contacts casing groove shoulder 124.

One steam flow path through labyrinth seal assembly 100 is defined from high pressure region 106 to low pressure region 108 through clearance area 110 and between teeth 104 and rotor shaft surfaces 107 and 109. Steam flow is modulated as a function of radial positioning of seal ring 102. As seal ring 102 moves radially outward, the overall size of clearance area 110 increases and steam flow through clearance area 110 increases. Conversely, as seal ring 102 moves radially inward, clearance area 110 decreases and steam flow through clearance area 110 decreases.

A second steam flow path is defined from high pressure annular space 134 to low pressure annular space 136 through casing groove 112. Steam at a higher pressure may flow from annular space 134 through an annular opening 140 defined between casing groove shoulder 124 and seal ring neck portion 128. Steam is channeled through opening 140 to a high pressure region 142 defined between casing groove shoulder outer surface 126 and seal ring outer ring portion ring circumferential surface 122 before entering a casing groove high pressure portion 144 defined by the casing 72 and seal ring outer ring portion 120. Steam exits casing groove high pressure portion 144 and enters a casing groove radially outer portion 148 defined between a casing groove radially outer surface 146 and seal ring outer portion radially outer surface 131. Steam may then flow to a low pressure portion 150 defined by the casing 72 and seal ring outer ring portion 120 and to a low pressure side shoulder region 152 defined between casing groove shoulder outer surface 126 and seal ring outer ring portion inner circumferential surface 122. Steam exits low pressure side shoulder region 152 through an annular opening 154 defined between casing groove shoulder 124 and seal ring neck portion 128, wherein the steam is discharged into annular space 136.

Radially outward travel of seal ring 102 is limited when seal ring outer surface 130, or any portion thereof, contacts casing radial surface 118. This position is referred to as the fully retracted position. Radially inward travel of seal ring 102 is limited when seal ring surface 122 contacts casing groove shoulder surface 126. This position is referred to as the fully inserted position, as is illustrated in FIG. 3. Sufficient space to accommodate expected transient misalignments of rotor shaft 60 and casing 72, without incurring damage to teeth 104, is provided for.

At low or no load operating conditions, the weight of seal ring 102, the confining limits of casing 72, frictional forces, and the forces of a plurality of optional biasing spring systems (not shown on FIG. 3) act on seal ring 102. The overall effect is that seal ring 102 is biased to a diameter as limited by the radially outward limit of travel of seal ring 102.

Internal pressures throughout the turbine 10 are substantially proportional to load. As load and steam mass flow are each increased, local pressures increase in a substantially linear fashion. This relationship can be used to determine desired positions of seal ring 102 at predetermined turbine operating conditions. For example, as steam flow to turbine 10 is increased, steam pressure in annular space 134 and in casing groove 112 is likewise increased. The increased steam pressure exerts a radially inward force to seal ring 102 that is substantially carried by seal ring outer surfaces 130 and 131.

The increased steam pressure in high pressure region 106 induces increased steam flow via casing groove 112 through annular space 134, annular opening 140, shoulder region 142, casing groove high pressure portion 144, casing groove radially outer portion 148, casing groove low pressure portion 150, shoulder region 152, and annular opening 154 into annular region 136. The increased steam pressure in high pressure region 106 also induces increased pressures in the path defined from annular space 134 to annular space 136 via casing groove 112 as described above. The pressures in each subsequent region of the path are less than the regions preceding them. For example, the steam pressure in casing groove low pressure portion 150 is less than the steam pressure in casing groove high pressure portion 144. This pressure differential induces an increased force to the right on seal ring inner ring portion 114, seal ring neck portion 128 and seal ring outer ring portion 120. The increased forces on these surfaces causes seal ring 102 to move axially toward the low pressure region 108 until seal ring neck contact pressure surface 132 contacts casing groove shoulder 124. When fully inserted steam flow from high pressure annular space 134 to low pressure annular space 136 via casing groove 112 is substantially prevented by seal ring 102.

The condition illustrated above causes steam pressure to induce an increased radially inward force to surfaces 130 and 131 as described above. The increased steam pressure also induces an increased radially inward force to seal ring 102 to overcome the previously discussed frictional forces and plurality of optional biasing spring subsystems (not shown) forces. The dimensions of seal ring 102 and casing groove 112 are selected to facilitate optimizing the clearance 110 defined between teeth 104 and rotor shaft 60 surface for loaded, steady state operation.

Figure 4:
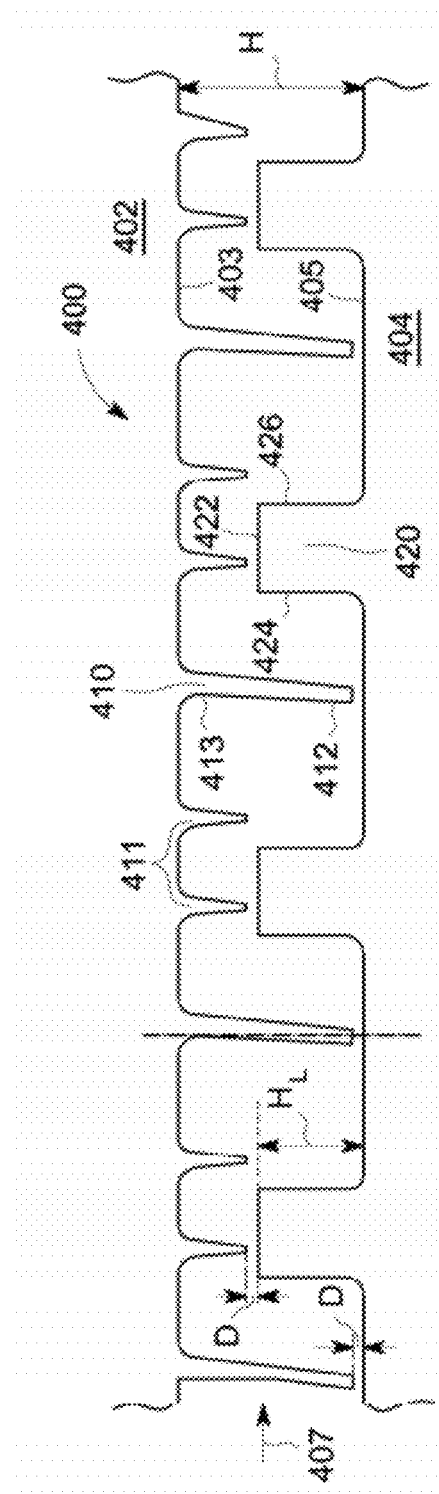
FIG. 4 illustrates a partial cross-sectional view of a labyrinth seal that may be used with the steam turbine shown in FIG. 1, according to an aspect of the present invention.

FIG. 4 illustrates a partial cross-section view of a labyrinth seal 400 according to an aspect of the present invention. The seal 400 includes a chamfered or inclined stator tooth 410 and lands 420 having increased height compared to other known seals. The height H of the seal is the distance between the inner radial surface 403 of the stator 402 and the inner radial surface 405 of rotor 404. The clearance distance D is the distance between the bottom of the long stator teeth 410 and inner radial surface 405, or the distance between the bottom of the shorter stator teeth 411 and the top of lands 420. In some applications these two clearance distances may be the same or different. The clearance distance D may range between about 20 mils to about 80 mils, or between about 20 mils to about 200 mils, or may have any suitable distance as desired in the specific stage or application. The stator 402 is a stationary structure that may also include a stator inner support and a packing ring. The rotor 404 is a rotating structure that may also include a shaft, a disk or a drum connected to the rotor 404.

The flow through the seal 400 flows generally in the left to right direction as indicated by arrow 407. Each land 420 includes a radially outer surface 422, an upstream axial surface 424 and a downstream axial surface 426. The height $H_L$ of each land 420 is defined as the distance between radially outer surface 422 and inner radial surface 405. The preferred height $H_L$ for each land is about three fifths of the seal height H (i.e., $H_L$=about 3/5*H). The length of the short teeth may be about one fifth of the seal height and the length of the long teeth may be about four-fifths of the seal height. However, other land heights and tooth lengths may be used as desired in the specific application.

The long stator teeth 410 are also chamfered or configured to angle axially upstream along their length. For example, the lower end 412 (or bottom) of stator tooth 410 is located more axially upstream than the upper portion 413. The chamfered stator teeth 410 are angled or "leaned" into the flow and create more of a disturbance (increase turbulation) to the flow than straight teeth (as in FIG. 3). It is to be understood that the teeth could be on either the rotating or stationary parts, and the lands could also be on the rotating or stationary parts.

Figure 5:
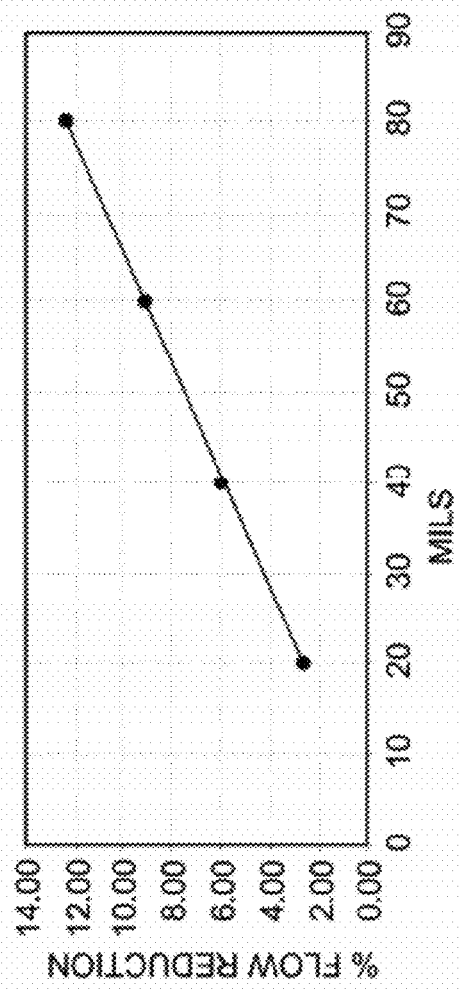
FIG. 5 is a chart of the percent flow reduction vs. the clearance distance in mils between a seal similar to that shown in FIG. 3 and the seal shown in FIG. 4.

FIG. 5 is a chart of the percent flow reduction vs. the clearance distance in mils between a seal similar to that shown in FIG. 3 and the labyrinth seal 400 in FIG. 4. Operational transient conditions, which may include turbine/engine startup, shutdown, or load swings, often result in axial movement of the rotating parts in relation to stationary parts, which may cause the teeth or other structures (e.g., lands, etc.) that define the labyrinth seal on one surface to contact, rub or collide with the teeth or structures on the opposing surface.

Therefore, it would be advantageous to increase the clearance distance D while improving the flow restriction through the seal.

The seal 400, when compared to the seal of FIG. 3, has about a 3% flow reduction when the clearance distance is 20 mils and about a 12% flow reduction when the clearance distance is 80 mils. In fact, at all clearance distances between 20 and 80 mils, the seal 400 has better flow reduction than the seal of FIG. 3. Compared to prior known seals, the seal 400 is less sensitive to radial clearance and axial movement, while providing improved flow restriction. This allows the seal to have a greater clearance distance and reduces any rubbing during operational transient conditions.

Figure 6:
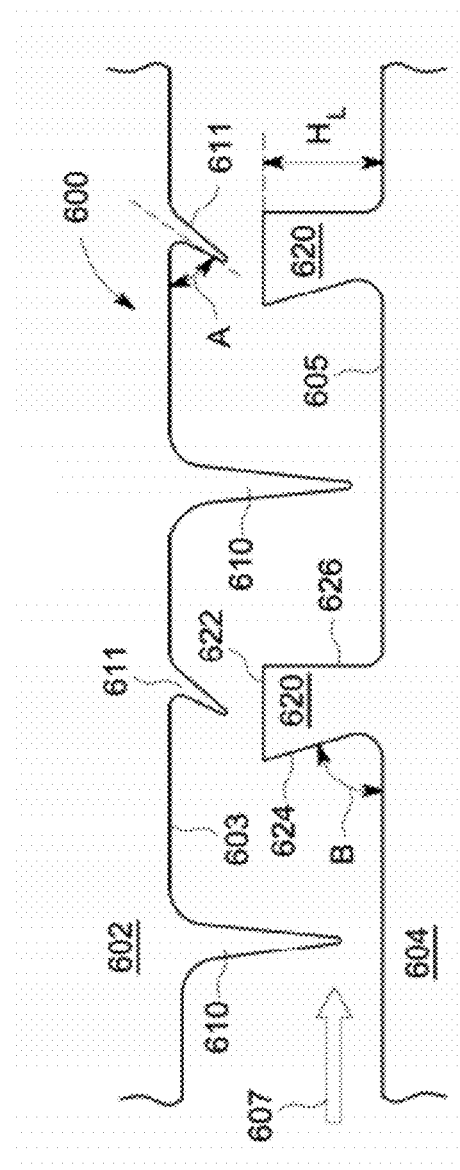
FIG. 6 illustrates a partial cross-sectional view of a labyrinth seal that may be used with the steam turbine shown in FIG. 1, according to an aspect of the present invention.

FIG. 6 illustrates a partial cross-sectional view of a labyrinth seal 600 according to an aspect of the present invention. The stator 602 includes long teeth 610 and shorter teeth 611. The flow direction through seal 600 is illustrated by arrow 607. The shorter teeth 611 are angled upstream and the long teeth 610 may by generally straight (i.e., pointing radially downward) or may be angled upstream. The short teeth 611 may be angled upstream at angles from about ten to about forty degrees with respect to the radial axis (e.g., a vertical line in FIG. 6). Alternatively, the angle A between inner radial surface 603 (which is aligned in the axial direction) and the axis of short teeth 611 may be from about fifty to about eighty degrees. Other angles may be used as desired in the specific application.

The lands 620, on rotor 604, each include a radially outer surface (or top) 622, an upstream surface 624 and a downstream axial surface 626. The height $H_L$ of each land 620 is defined as the distance between radially outer surface 622 and inner radial surface 605. The preferred height $H_L$ for each land is about three fifths of the seal height H (i.e., $H_L$=about ⅗*H). However, other land heights may be used as desired in the specific application. The upstream surface 624 is angled upstream at an angle from about ten to about forty degrees with respect to the radial axis (e.g., a vertical line in FIG. 6). Alternatively, the angle B between radial rotor surface 605 and the upstream surface 624 may be from about fifty to about eighty degrees. Other angles may be used as desired in the specific application.

It has been discovered through experimentation and computer modeling of flow patterns that certain slanted or angled surfaces, certain dimensions and certain ratios pertaining to the dimensions are more effective at sealing than others. A computational fluid dynamic simulation was performed and compared the flow coefficient between the seal of FIG. 3 and seal 600. The seal 600 had about a ten percent better flow coefficient than the seal of FIG. 3. The reason for this improvement in flow coefficient is due to how the flow goes through the seal 600. In the region near the tooth 611 above land 620, the flow experiences more turning and better throttling, and this in turn reduces leakage. The increased amount of flow turning is due to the angled surface 624 of land 620 and the angled tooth 611.

Figure 7:
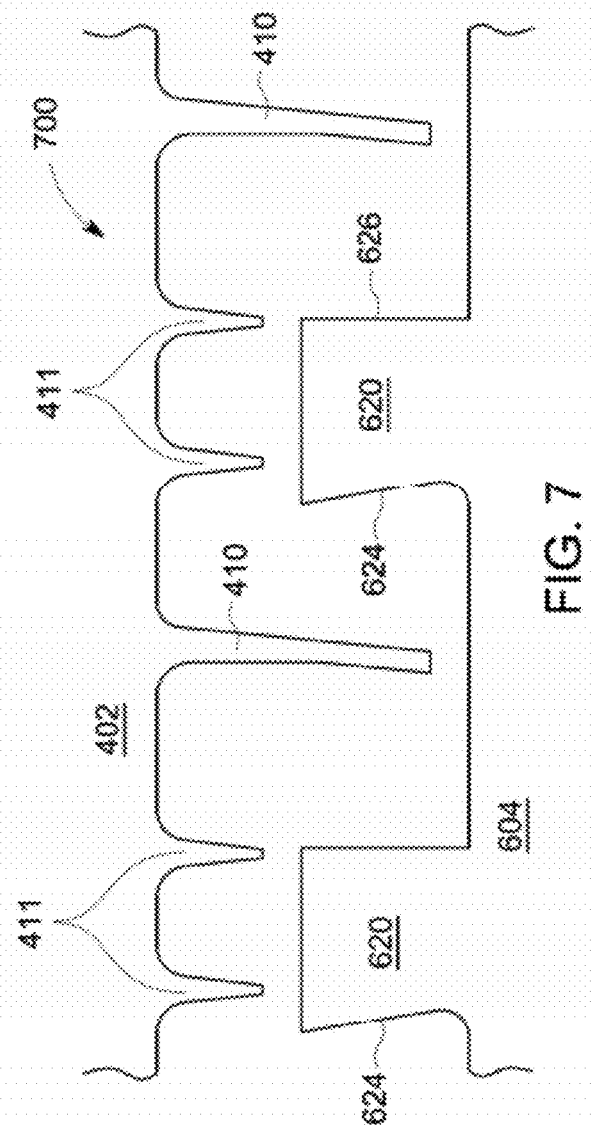
FIG. 7 illustrates a partial cross-sectional view of a labyrinth seal that may be used with the steam turbine shown in FIG. 1, according to an aspect of the present invention.

FIG. 7 illustrates a partial cross-sectional view of a labyrinth seal 700 according to another aspect of the present invention. The seal 700 combines the stator teeth of FIG. 4 with the rotor lands of FIG. 6. FIG. 8 illustrates a partial cross-sectional view of a labyrinth seal 800 according to another aspect of the present invention. The seal 800 combines the stator teeth of FIG. 4 and FIG. 6 with the rotor lands of FIG. 6. The stator 802 includes short angled teeth 611 and long angled teeth 410. The seal 800 can be configured to have one tooth 611 located between long angled teeth 410 (as shown), or more than one tooth 611 can be located between each set of long angled teeth 410.

Although the present examples describe the teeth being disposed on the stationary surface (the stator) and the lands on the rotating surface, it is possible and may be desired in some applications, to have the teeth disposed on the rotating surface and the lands on the stationary surface.

In general, as already stated, the non-contact seal structure of the present invention allows free axial movement of the rotor while preventing damage to the labyrinth seal that often results from the axial movement of the opposing structures during transient operating conditions. Moreover, the structure of the seal, according to the aspects of the present invention, provides effective sealing as it creates a flow path that discourages the leakage of working fluid, as discussed previously.

While the invention has been described in connection with what is presently considered to be one of the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A seal for preventing axial leakage through a radial gap between a stationary structure and a rotating structure, wherein the radial gap is defined by an inner radial surface that opposes an outer radial surface across the radial gap, the seal comprising:
    at least one land disposed on one of the inner radial surface and the outer radial surface, the at least one land comprising an upstream surface that is configured to slope upstream at an angle from about 10 degrees to about 40 degrees with respect to a radial axis;
    at least one first tooth that projects from the other of the inner radial surface and the outer radial surface;
    at least one second tooth that projects from the other of the inner radial surface and the outer radial surface, the at least one second tooth configured to be shorter than the at least one first tooth;
    wherein at least one of the first tooth and second tooth, is configured to extend at a first angle upstream, the first angle defined between a radial surface from which the first tooth or second tooth projects and an upstream surface of at least one of the first and second tooth, and wherein the first angle is less than or equal to about 80 degrees.

2. The seal according to claim 1, wherein the first angle is greater than or equal to about 50 degrees.

3. The seal according to claim 1, wherein the at least one land is disposed on the stationary structure and the at least one first tooth and the at least one second tooth are disposed on the rotating structure.

4. The seal according to claim 1, wherein the at least one land is disposed on the inner radial surface and the at least one first tooth and the at least one second tooth are disposed on the outer radial surface.

5. The seal according to claim 1, wherein the at least one first tooth is configured to extend at an angle upstream.

6. The seal according to claim 1, wherein the at least one second tooth is configured to extend at an angle upstream.

7. The seal according to claim 1, wherein both the at least one first tooth and the at least one second tooth are configured to extend at an angle upstream.

8. The seal according to claim 1, wherein the seal has a seal height defined by a distance between the inner radial surface and the outer radial surface; and
    wherein a height of the at least one first tooth is equal to about four-fifths of the seal height.

9. The seal according to claim 1, wherein the seal has a seal height defined by a distance between the inner radial surface and the outer radial surface; and
   wherein a height of the at least one second tooth is equal to about one-fifth of the seal height.

10. The seal according to claim 1, wherein the seal has a seal height defined by a distance between the inner radial surface and the outer radial surface; and
    wherein a height of the at least one land is equal to about three-fifths of the seal height.

11. The seal according to claim 1, wherein at least one of the at least one second tooth is disposed substantially radially opposite to at least one of the at least one land.

12. The seal according to claim 1, wherein the at least one first tooth and the at least one second tooth are axially spaced from each other.

13. The seal according to claim 12, wherein two of the at least one second tooth are located between each of the at least one first tooth.

14. The seal according to claim 1, wherein a clearance distance is defined as the distance between an end of the at least one first tooth or the at least one second tooth and an opposing radial surface; and
    wherein the clearance distance is between about twenty mils and about eighty mils.

15. The seal according to claim 1, wherein a clearance distance is defined as the distance between a top surface of the at least one land and an end of the at least one second tooth, where the top surface is radially opposed to the end of the at least one second tooth; and
    wherein the clearance distance is between about twenty mils and about eighty mils.

16. The seal according to claim 1, wherein:
    the stationary structure comprises at least one of a stator, a stator inner support, and a packing ring; and
    the rotating structure comprises one of a rotor, a shaft, and a disk or drum connected to a rotor.

17. The seal according to claim 1, wherein the seal is located in at least one of an engine, a gas turbine, steam turbine, a turbine and a turbine engine.

18. The seal according to claim 1, wherein a clearance distance is defined as the distance between an end of the at least one first tooth or the at least one second tooth and an opposing radial surface; and
    wherein the clearance distance is between about twenty mils and about two hundred mils.

19. A seal for reducing axial leakage through a radial gap between a stationary structure and a rotating structure, wherein the radial gap is defined by an inner radial surface that opposes an outer radial surface across the radial gap, the seal comprising:
    at least one land disposed on one of the inner radial surface and the outer radial surface, the at least one land comprising an upstream surface that is configured to slope upstream at an angle from about 10 degrees to about 40 degrees with respect to a rotor radial surface;
    at least one first tooth that projects from the other of the inner radial surface and the outer radial surface;
    at least one second tooth that projects from the other of the inner radial surface and the outer radial surface, the at least one second tooth configured to be shorter than the at least one first tooth;
    wherein at least one of the first tooth and second tooth, is configured to extend at a first angle upstream, the first angle defined between a radial surface from which the first tooth or second tooth projects and an upstream surface of at least one of the first and second tooth, and wherein the first angle is less than or equal to about 80 degrees.

20. A seal for reducing axial leakage through a radial gap between a stationary structure and a rotating structure, wherein the radial gap is defined by an inner radial surface that opposes an outer radial surface across the radial gap, the seal comprising:
    at least one land disposed on one of the inner radial surface and the outer radial surface, the at least one land comprising an upstream surface that is configured to slope upstream at an angle from about 10 degrees to about 40 degrees with respect to at least one of the inner radial surface or the outer radial surface;
    at least one first tooth that projects from the other of the inner radial surface and the outer radial surface;
    at least one second tooth that projects from the other of the inner radial surface and the outer radial surface, the at least one second tooth configured to be shorter than the at least one first tooth;
    wherein at least one of the first tooth and second tooth, is configured to extend at a first angle upstream, the first angle defined between a radial surface from which the first tooth or second tooth projects and an upstream surface of at least one of the first and second tooth, and wherein the first angle is less than or equal to about 80 degrees.

* * * * *